United States Patent [19]

Ruyak et al.

[11] Patent Number: 4,487,557

[45] Date of Patent: Dec. 11, 1984

[54] MAGNETICALLY DRIVEN CENTRIFUGAL PUMP

[75] Inventors: Robert F. Ruyak; Theodore R. Silver, both of Erie; Rocco J. Tomasino, North East, all of Pa.

[73] Assignee: Autoclave Engineers, Erie, Pa.

[21] Appl. No.: 425,870

[22] Filed: Sep. 28, 1982

[51] Int. Cl.³ .............. F04B 35/04; F03B 11/06; H02K 5/10

[52] U.S. Cl. .............. 417/420; 417/DIG. 1; 310/104; 415/132; 415/170 A

[58] Field of Search .............. 417/365, 420, DIG. 1; 310/104; 415/170 A, 170 R, 131, 132

[56] References Cited

U.S. PATENT DOCUMENTS

| | | | |
|---|---|---|---|
| 2,190,670 | 2/1940 | Mann | 415/170 A |
| 3,280,748 | 10/1966 | Ogles | 415/132 |
| 3,378,710 | 4/1968 | Martin, Jr. | 417/420 |
| 3,644,061 | 2/1972 | McFarlin | 417/420 X |
| 3,918,852 | 11/1975 | Carter | 417/365 X |
| 4,120,618 | 10/1978 | Klaus | 417/420 |
| 4,277,707 | 7/1981 | Silver et al. | 417/420 X |

FOREIGN PATENT DOCUMENTS

| | | | |
|---|---|---|---|
| 386432 | 3/1934 | United Kingdom | 415/132 |
| 1242243 | 8/1971 | United Kingdom | 417/420 |

*Primary Examiner*—Carlton R. Croyle
*Assistant Examiner*—T. Olds
*Attorney, Agent, or Firm*—Webb, Burden, Robinson & Webb

[57] ABSTRACT

A centrifugal pump for circulating fluids at high pressure comprises an impeller having an axis of rotation, a casing defining a pumping chamber, a nonmagnetic canister sealed at one end and extending away from the pumping chamber surrounding an extension of the impeller axis, and an impeller shaft journaled in the nonmagnetic canister. The shaft has mounted thereto circumferentially magnetized rare earth cobalt magnets. A drive magnet assembly comprising a sleeve is journaled about the nonmagnetic canister with circumferentially magnetized rare earth cobalt magnets mounted therein. Rotation of the sleeve results in synchronous rotation of the impeller and impeller shaft.

7 Claims, 2 Drawing Figures

MAGNETICALLY DRIVEN CENTRIFUGAL PUMP

DESCRIPTION

TECHNICAL FIELD

This invention relates to a magnetically driven centrifugal pump for circulating fluids at high pressure, say for use in excess of 3,000 psi.

BACKGROUND

For high pressure pumping applications, torque is often transferred to the pump by a shaft passing through a packing. The packing has a tendency to leak (sometimes this is planned) and is difficult to maintain. The elimination of the packing is, therefore, highly desirable. Three prior approaches to the elimination of the packing have been electromagnetic induction drives (i.e., "canned" motors), permanent magnet induction drives, and inner and outer permanent magnet drives. In some of these approaches, great emphasis has been upon the circulation of the fluid being pumped into and out of the rotor chamber to provide cooling and lubrication. They have also been designed to provide a measure of thrust balancing to avoid the use of thrust bearings. The implementation of these approaches have been complex. At least partially due to the complexity of the construction, the pump has often involved at least three gasket-type high pressure seals that require proper compression to maintain the seal.

SUMMARY OF THE INVENTION

It is an object of this invention to provide a mechanically simple, magnetically driven high pressure centrifugal pump. It is a further object of this invention to provide an easily adjusted thrust bearing and an easily disassembled and assembled pump for adjustment of the thrust bearing which responds to impeller thrust.

It is a further object to provide a magnetically driven high pressure centrifugal pump having a nonmagnetic canister (through which torque is transferred) which is releasably connected, but unbolted, to the casing defining the impeller chamber. Moreover the canister and casing can be sealed by two self-sealing O-rings that avoid the need for pressure sensitive gaskets.

It is yet another object of this invention to provide a magnetically drive centrifugal pump that is synchronously driven.

Briefly according to this invention, a high pressure centrifugal pump has an impeller which rotates about an axis of rotation. A casing defines a pumping chamber. The pumping chamber is sized and configured to receive the impeller. The casing defines an intake passage along an extension of the axis of rotation and an outlet passage extending from the periphery of the impeller and pumping chamber. A nonmagnetic canister sealed at one end extends away from the pumping chamber and is in communication therewith. The canister surrounds the extension of the impeller axis in a direction away from the intake passage. An impeller shaft is fixed at one end of the impeller. The shaft is journaled in the nonmagnetic canister. The shaft has mounted thereto circumferentially magnetized rare earth cobalt magnets. A nonlubricated bushing is positioned in the nonmagnetic canister for rotatably holding the impeller shaft. Another nonlubricated bushing is positioned at least partially in the nonmagnetic canister for rotatably holding the impeller shaft and restraining its axial movement. Means are provided for precision adjusting of the second bushing along the impeller axis. A drive magnet assembly comprises a sleeve journaled about the nonmagnetic canister with circumferentially magnetized rare earth cobalt magnets mounted therein. Thus, rotation of the sleeve results in synchronous rotation of the impeller and impeller shaft.

Preferably, the pump casing is comprised of a mounting plate having a countersunk bore therein along the impeller axis and a front plate defining the circumferential periphery of the pump chamber and the inlet passage. The mounting plate and front plate have a rabbeted joint and together define an annular space for receiving an O-ring seal and fasteners for securing the mounting plate and front plate together.

Preferably, the nonmagnetic canister has a radial collar arranged near its opening to seat in the countersunk portion of the bore in the mounting plate and the canister and mounting plate together define an annular space for receiving an O-ring seal. The nonmagnetic canister has external threads near the location where it emerges from the mounting plate such that a nut or threaded bore with matching internal threads can secure the collar of the magnetic canister in the countersunk portion of the mounting plate.

Preferably, the means for precision adjustment of the bushing that restrains axial movement comprises a gland nut having external threads threadably engaging internal threads in a countersunk portion of the bore within the nonmagnetic canister. The gland nut has a radial surface arranged to engage a radial surface associated with the bushing and a key to secure the bushing against rotation relative to the canister. The impeller shaft has a radial flange extending outwardly into the countersink portion of the bore within the nonmagnetic canister. The radial flange has an axial face looking toward the pumping chamber for abutting the bushing. The impeller is releasably attached to the impeller shaft and securing the impeller to the impeller shaft captures the bushing between a radial face associated with the impeller and the radial flange on the impeller shaft.

Preferably, the pump has circumferentially magnetized cylindrical rare earth cobalt magnets attached to the sleeve and the impeller shaft which define an equal number of north and south magnetic poles having the same substantially equiangular spacing.

THE DRAWINGS

FIG. 1 is a section along the axis of the impeller and impeller shaft of a magnetically driven centrifugal pump according to this invention; and FIG. 2 is a section taken along lines II—II in FIG. 1.

DESCRIPTION OF THE PREFERRED EMBODIMENT

Figure 1:
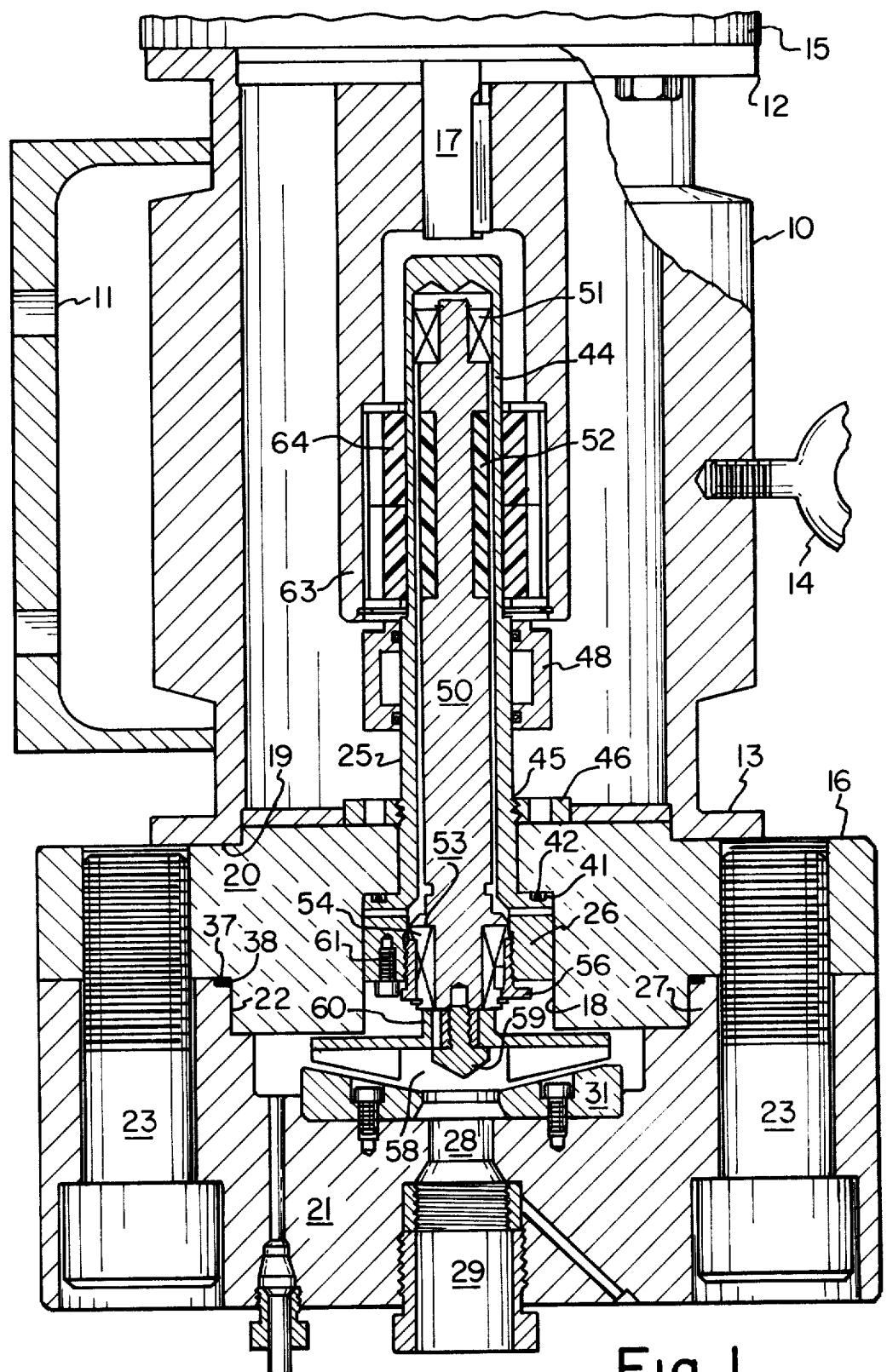

Referring now to FIG. 1, a coupling case 10 is arranged to be fastened to a base by bolts through bores 11. An electric or other motor 15 is secured to the coupling case by a flange 12 provided at one end and to the pump casing 16 supported by a flange 13 on the other end. Thus, once disconnected from the base and from the plumbing of the system, the entire assembly can be positioned or reposition by lifting eyebolt 14.

The essential function of the coupling case is to support the motor and the pump casing and to protect the rotating elements of the coupling. The purpose of the motor is to provide torque to the input shaft 17. There is no limitation upon the type of motor used to drive the input shaft. The canned pumps of the prior art are basically induction motors; hence, they can only be run at one speed (ignoring slip) which is determined by frequency of power source and other fixed parameters of the motor. But, with magnetic coupling the torque input to the coupling, for example, may be from a direct current variable speed motor giving the user the ability to change flow rates.

The pump casing comprises a mounting plate 20 and a front plate 21. The mounting plate 20 abuts the coupling case 10 and may have a rabbeted fit with the coupling case abutting the end wall 19. Large bolts 23 hold the mounting plate and front plate together. Thus easy access to the impeller for repair and inspection is facilitated. The mounting plate has a bore therein to receive a nonmagnetic canister 25 and a countersunk well 18 for receiving the canister. The canister 25 has a collar 26 that rests in the well 18. The end of the mounting plate facing the front plate has an annular recess 22 that permits a rabbeted engagement therewith.

Figure 2:
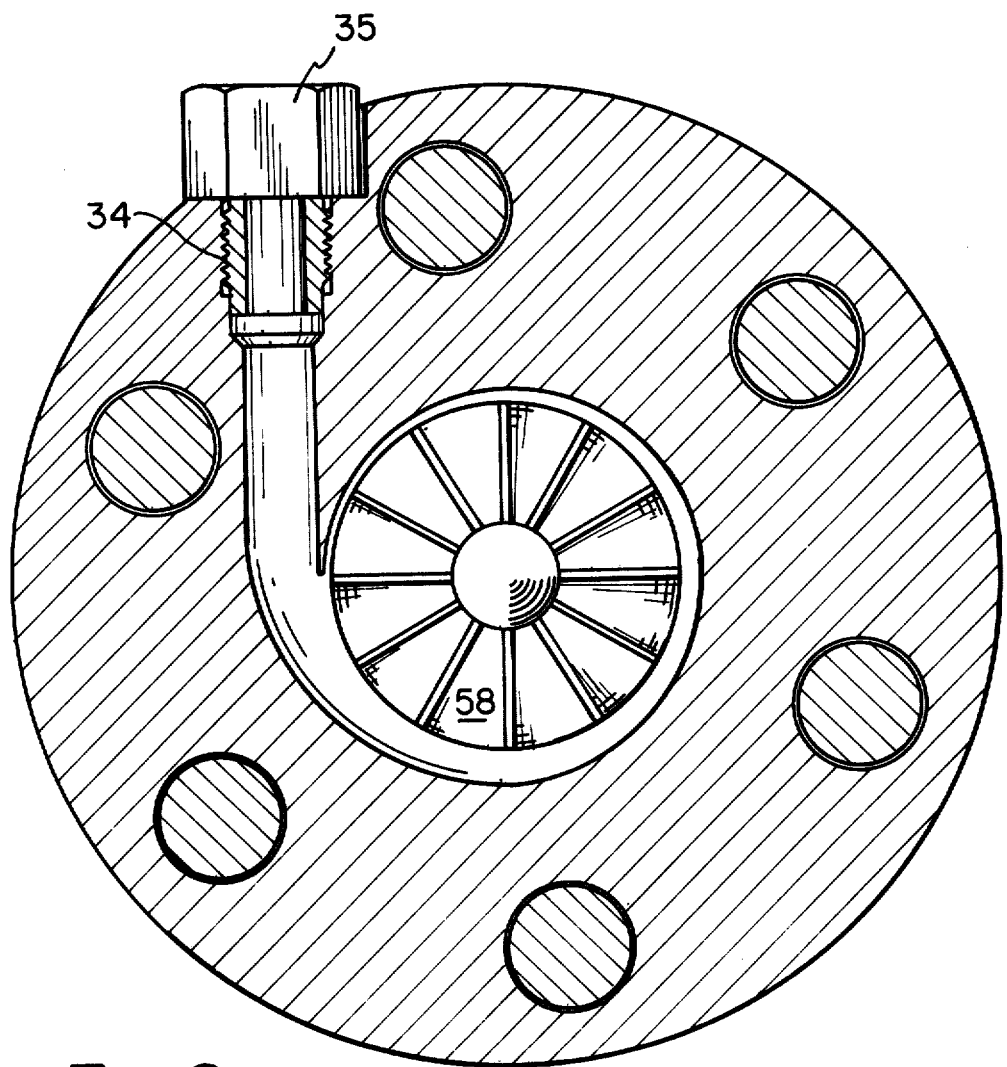

The front plate 21 has a well therein facing the mounting plate that defines the outer periphery of the pumping chamber. The front plate has a cylindrical extension 27 that fits to the annular recess 22 of the mounting plate to align the two parts. An inlet passage 28 is arranged along an extension of the axis of the impeller. It comprises a socket with internal threads for receiving a gland nut 29 which secures the inlet fitting. An insert 31 for shaping the configuration of the impeller chamber is bolted to the front plate. Thus the shape of the impeller and the impeller chamber may be customized somewhat according to the application. An outlet passage (see FIG. 2) extends generally tangentially from the periphery of the impeller chamber in the front plate to a socket 34 with internal threads for receiving a gland nut 35 for securing an outlet fitting. The shape of the impeller chamber is a volute with the larger portion thereof near the tangential outlet passage. An annular recess 37 is provided either in the front plate or the mounting plate along the joint therebetween for holding an O-ring 38. The O-ring is self-sealing and does not require the same attention a gasket would require.

The nonmagnetic canister 25 has an elongate barrel 44 enlarging to an integral collar section 26. The collar section has an annular recess 41 along the surface abutting the surface of the well of the mounting plate for supporting an O-ring 42. Thus the self-sealing O-ring seals the canister to the pump casing.

The elongate barrel 44 of the canister extends well within the coupling case. The barrel has external threads 45 near where it emerges from the casing. In this way locknut 46 can pull the collar 26 against the back of the well 18 in the pump casing to provide an initial sealing of the O-ring 42 and to secure the pump casing to the coupling case.

An additional feature of the pump according to this invention is a cooling jacket 48 pressed over the canister barrel and sealed by two O-rings thereto.

The impeller shaft 50 is journaled within the nonmagnetic canister by a back bearing 51 which is of the nonlubricated type (carbon-graphite or PTFE, for example). Keyed to the shaft are driven magnets 52. Preferably these comprise rare earth cobalt cylindrical magnets having an even number of north and south poles equiangularly spaced about the outer circumference thereof. The impeller shaft has a nonmagnetic corrosion resistant jacket that protects the magnets from the liquid being pumped.

Where the impeller shaft emerges into the well 18 it has a radial flange 53 with a radial surface facing the pumping chamber. This surface bears upon the thrust bearing 54 positioned in the well. The thrust bearing is a nonlubricated bearing of a material the same or similar to the back bearing. The thrust bearing 54 is captured between the radial flange 53 and the impeller 58 preventing axial motion thereof.

The collar 26 has an enlarged bore which has internal threads that receive the gland nut 56. The gland nut is keyed to the thrust bearing 54 to prevent rotation relative thereof and interfits with the bearing to restrict the axial movement under thrust. The impeller 58 is bolted to the impeller shaft by fastener 59. A boss 60 on the back face of the impeller slides on the impeller shaft for aligning the two and the boss abuts a ridge on the shaft restricting its axial movement. A portion of a radial end face of the boss faces a radial end face of the thrust bearing 54. This engagement restricts the travel of the impeller toward the back face of the impeller chamber.

The distance between the back face of the impeller and the impeller chamber is critical. This distance can be precisely adjusted by the gland nut 56 carrying the thrust bearing 54. A lock screw or cap screw 61 prevents disturbance of the gland nut 56. The impeller is removed from the impeller shaft to permit access to the gland nut 56 when adjusting the thrust bearing.

A sleeve 63 surrounds the exterior of the barrel of the canister. The sleeve carries drive magnets 64 which, like the driven magnets of the impeller shaft, are cylindrical rare earth cobalt magnets and have an even number of equiangular spaced north and south poles about the inner circumference thereof. Of course, the number of poles on the driven magnets is the same as the number of poles on the drive magnets. The sleeve is spaced from the exterior of the canister barrel by a spacer typically of a synthetic polymer nonlubricated bearing material. The sleeve 63 is keyed to the output shaft 17 of the motor. As the sleeve is caused to rotate, the magnetic coupling drives the impeller shaft in synchronism therewith.

Having thus described the invention with the detail and particularity required by the Patent Laws, what is desired protected by Letters Patent is set forth in the following claims.

We claim:

1. A high pressure centrifugal pump comprising:
an impeller having an axis of rotation;
a metal casing defining a pumping chamber, said pumping chamber sized and configured to receive said impeller, the casing defining an intake passage along an extension of the axis of rotation, and an outlet passage extending from the periphery of the impeller, said casing comprising a mounting plate having a countersunk bore therein along the impeller axis extending away from the impeller and a front plate defining the circumferential periphery of the pumping chamber and the inlet passage, said mounting plate and front plate have a rabbeted joint and together define an annular space for receiving a seal and means for securing the mounting plate and front plate together;
a nonmagnetic metal canister comprising an elongate barrel sealed at one end and extending away from the pumping chamber and in communication therewith, said canister surrounding the extension of the impeller axis in a direction away from the intake passage;

a metal impeller shaft fixed at one end to the impeller, said shaft being journaled in the nonmagnetic canister, said shaft having mounted thereto circumferentially magnetized rare earth cobalt magnets;

a first self-lubricating bushing positioned in the nonmagnetic canister for rotatably holding the impeller shaft;

a second self-lubricating bushing positioned at least partially in the nonmagnetic canister for rotatably holding the impeller shaft and restraining its axial movement;

means adjacent the impeller for precision adjusting of the second bushing along the impeller axis; and a drive magnet assembly comprising a sleeve journaled about the nonmagnetic canister with circumferentially magnetized rare earth cobalt magnets mounted therein, whereby rotation of the sleeve results in synchronous rotation of the impeller and impeller shaft.

2. The pump according to claim 1 wherein the nonmagnetic canister has a radial collar arranged near its opening to sit in the countersunk portion of the bore in the mounting plate and the canister and mounting plate together defining an annular space for receiving an O-ring seal whereby pressure in the impeller chamber forces the radial collar to compress the said O-ring.

3. The pump according to claim 2 wherein the means for precision adjustment of the second bushing comprises a gland nut having external threads threadably engaging internal threads in a countersunk portion of the bore within the nonmagnetic canister, said gland having a radial surface arranged to engage a radial surface associated with the bushing and means to secure the bushing against rotation relative to the canister.

4. The pump according to claim 2 wherein the impeller shaft has a radial flange extending outwardly into the countersunk portion of the bore within the nonmagnetic canister, said radial flange having an axial face looking toward the pumping chamber for abutting the second bushing.

5. The pump according to claim 4 wherein the impeller is releasably attached to the impeller shaft and securing the impeller to the impeller shaft captures the second bushing between a radial face associated with the impeller and the radial flange on the impeller shaft.

6. The pump according to claim 2 wherein the nonmagnetic canister has external threads near the location where it emerges from the mounting plate such that a nut or threaded bore with matching internal threads can secure the collar of the magnetic canister in the countersunk portion of the mounting plate.

7. A pump according to claim 1 wherein said circumferentially magnetized cylindrical rare earth cobalt magnets attached to the sleeve and the impeller shaft define an equal number of north and south magnetic poles having the same substantially equiangular spacing.

* * * * *